L. RAVEL.
DRIVING MECHANISM FOR MOTOR CARS.
APPLICATION FILED FEB. 4, 1911.
1,142,621. Patented June 8, 1915.
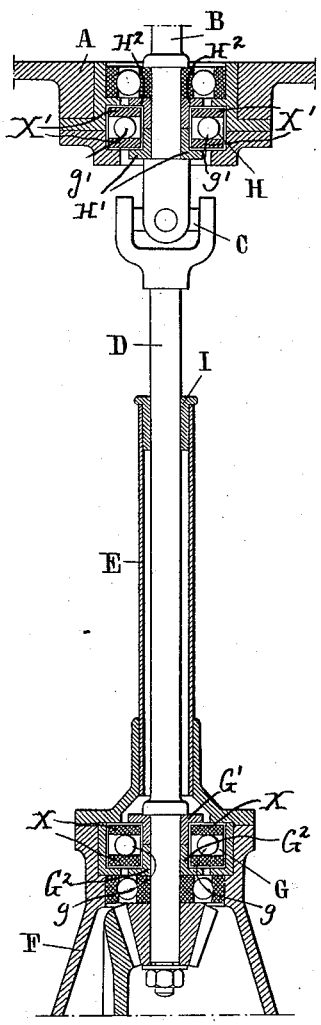

UNITED STATES PATENT OFFICE.

LOUIS RAVEL, OF BESANÇON, FRANCE.

DRIVING MECHANISM FOR MOTOR-CARS.

1,142,621.  Specification of Letters Patent.  Patented June 8, 1915.

Application filed February 4, 1911. Serial No. 606,592.

*To all whom it may concern:*

Be it known that I, LOUIS RAVEL, a citizen of the French Republic, residing at Besançon, in France, have invented certain new and useful Improvements in Driving Mechanism for Motor-Cars; and I do hereby declare the following to be a full, clear, and exact description of the same.

My invention relates to motor-vehicles of the shaft-driven type, and it relates more particularly to the means for connecting the rear axle with the chassis of the vehicle.

The invention consists in the novel construction, arrangement and combination of parts as hereinafter fully described, illustrated in the drawing and pointed out in the appended claims.

In motor-vehicles the rear driving axle must be connected with the chassis so as to transmit thereto the thrust of the driving wheels but so that it can be displaced in relation thereto according to the unevenness of the road and the flexion of the springs.

Hitherto this connection has been effected either by means of radius rods or by connecting the sleeve that surrounds the Cardan shaft to the chassis by means of a fork or a turning joint, or more simply by utilizing the suspension springs for actuating the vehicle.

Two longitudinal driving shafts have also been proposed which were mounted like ball joints in front and capable of being moved transversely, these two shafts acting as thrust-rods between the back axle and the chassis.

The system of mounting according to the present invention consists in utilizing the Cardan shaft itself for the purpose of transmitting the thrust of the driving wheels, leaving the suspension springs absolutely free to fulfil their functions.

The accompanying drawing shows a sectional elevation of my invention.

In the drawing, A represents a portion of the casing for the change-speed gear and which casing supports the drive shaft B, at the end of which is the Cardan joint C.

D is the Cardan or propeller shaft which is arranged in a tube or housing E fixed to the casing F which incloses the gear on the live rear axle.

The thrust of the rear axle is transmitted to the Cardan shaft by a ball-bearing G which consists of two rings X, with balls $g$, between them. The balls and rings are mounted loosely between inner and outer flanged sleeves $G'$, $G^2$, fixed respectively to the shaft D and the casing F. The flanged sleeves form cages to receive the balls and rings.

The bearing is thus placed in a cage slightly larger than itself so as to be able to bear indifferently on one or the other of the rings which surround it. This arrangement enables a single bearing to transmit the action alike in the direction of the thrust and in the direction of traction, and thus to fulfil the function of two normal bearings with opposite action. The action of the Cardan shaft is transmitted through the joint C to the shaft B, and from there to the casing A which is connected with the chassis through the medium of a ball bearing H similar to bearing G, *i. e.* comprising two rings $X'$ between which the balls $g'$ are mounted, said rings and balls being loose within two flanged sleeves $H'$, $H^2$ secured respectively to the shaft B and casing A.

The reaction of the rear axle which would tend to cause it to rotate in an opposite direction to the driving wheels is compensated by the Cardan shaft D, and the tube E, the front end of which tube is provided with a ball or smooth bearing I.

It will be noted that the important feature of this invention resides in linking the rear axle to the chassis at a single fixed point which is the center of the Cardan joint. The axle is thus free to oscillate in all directions around this point, the suspension springs not being in any way impeded in their action.

It is obvious that each of the two double action bearings may be replaced by two single action bearings, which would in fact make four bearings, but the arrangement heretofore described has the advantage of simplicity.

What I claim is:

1. In a motor vehicle, the combination with the housing for the rear driving gears, the change speed gear casing, a propeller shaft, the speed gear drive shaft, a Cardan joint between the rear end of said drive shaft and the front end of the propeller shaft, a supporting bearing for the rear end of the said drive shaft, said bearing being arranged between the change speed gear casing and the said drive shaft on which the latter is rotatably mounted, and an end thrust bearing for the said drive shaft arranged between the rear end of the latter and the change speed gear casing and in rear of the said supporting bearing, of an end thrust bearing interposed between the rear end of the propeller shaft and the housing for the rear driving gears, a supporting bearing arranged between the rear end of the propeller shaft and the said housing in rear of the last-mentioned end thrust bearing upon which last-mentioned supporting bearing the said rear end of the propeller shaft is rotatably mounted, and a tube carried by the housing for the rear driving gears within which tube the propeller shaft is arranged and upon which tube said propeller shaft has a bearing, all arranged as and for the purpose specified.

2. In a motor vehicle, the combination with a propeller shaft, the change speed gear casing, the housing for the rear driving gears, the speed gear drive shaft, and a Cardan joint between the front end of the propeller shaft and the rear end of said speed gear drive shaft, of a supporting bearing for the rear end of the speed gear drive shaft, said bearing being arranged between the speed gear casing and the said drive shaft, an end thrust bearing interposed between the speed gear drive shaft and the change speed gear casing in rear of the said supporting bearing and comprising two rings surrounding the said drive shaft with their opposing faces lying in planes transverse of said drive shaft, balls between said rings, flanged sleeves forming cages between which said rings and balls are loosely mounted, said sleeves being secured respectively to the speed gear drive shaft and the change speed gear casing, a supporting bearing arranged between the rear end of the propeller shaft and the housing for the rear driving gears, and an end thrust bearing lying in front of the last-mentioned supporting bearing between the rear end of the propeller shaft and the housing for the rear driving gears, the last-mentioned end thrust bearing comprising two rings surrounding the rear end of the said drive shaft, balls between said rings, and flanged sleeves forming cages between which said rings and balls are loosely mounted, said sleeves being secured respectively to the propeller shaft and the said housing, all arranged substantially as and for the purpose specified.

In testimony whereof I affix my signature in presence of two witnesses.

LOUIS RAVEL.

Witnesses:
    JULES GOBILLOT,
    J. MASCONNET.

Copies of this patent may be obtained for five cents each, by addressing the "Commissioner of Patents, Washington, D. C."